(12) United States Patent
Watanabe et al.

(10) Patent No.: US 11,339,987 B2
(45) Date of Patent: May 24, 2022

(54) AIR-CONDITIONING APPARATUS

(71) Applicant: Mitsubishi Electric Corporation, Tokyo (JP)

(72) Inventors: Kazuki Watanabe, Tokyo (JP); Masahiko Takagi, Tokyo (JP); Yasuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 255 days.

(21) Appl. No.: 16/614,834

(22) PCT Filed: Jul. 21, 2017

(86) PCT No.: PCT/JP2017/026551
§ 371 (c)(1),
(2) Date: Nov. 19, 2019

(87) PCT Pub. No.: WO2019/016959
PCT Pub. Date: Jan. 24, 2019

(65) Prior Publication Data
US 2020/0208860 A1 Jul. 2, 2020

(51) Int. Cl.
*F24F 11/36* (2018.01)
*F24F 1/0025* (2019.01)

(52) U.S. Cl.
CPC ............ *F24F 11/36* (2018.01); *F24F 1/0025* (2013.01)

(58) Field of Classification Search
CPC .......... F24F 1/0025; F24F 1/005; F24F 11/36; F24F 2110/66
See application file for complete search history.

(56) References Cited

U.S. PATENT DOCUMENTS

| 5,624,639 A | 4/1997 | Ariga et al. |
| 2002/0178738 A1 | 12/2002 | Taira et al. |
| 2017/0314805 A1* | 11/2017 | Ikawa ..................... F24F 13/20 |

(Continued)

FOREIGN PATENT DOCUMENTS

| EP | 3 150 943 A1 | 4/2017 |
| JP | S63-027859 U | 2/1988 |
| JP | H08-192617 A | 7/1996 |

(Continued)

OTHER PUBLICATIONS

Office Action dated Jul. 2, 2021, issued in corresponding CN Patent Application No. 201780093113.2 (and English Machine Translation).

(Continued)

*Primary Examiner* — Joseph F Trpisovsky
(74) *Attorney, Agent, or Firm* — Posz Law Group, PLC

(57) ABSTRACT

An air-conditioning apparatus that uses refrigerant having a higher density than that of air, and includes a housing, an air inlet provided in a front surface of the housing to allow air in a room to flow into the housing, a heat exchanger that transfers heat between the refrigerant and the air that flows into the housing through the air inlet, an air outlet that allows the air subjected to heat exchange at the heat exchanger to be blown from the housing, a fan provided in an air passage extending from the air inlet to the air outlet, and a sensor that detects leakage of the refrigerant. The heat exchanger is provided above the fan, and the sensor is provided below the fan.

4 Claims, 5 Drawing Sheets

(56) References Cited

U.S. PATENT DOCUMENTS

2017/0336092 A1  11/2017  Ikawa et al.
2018/0313591 A1  11/2018  Obara et al.

FOREIGN PATENT DOCUMENTS

| JP | 2005-047440 A | 2/2005 |
|---|---|---|
| JP | 4599699 B2 | 12/2010 |
| JP | 2016-080220 A | 5/2016 |
| JP | 2016-090108 A | 5/2016 |
| JP | 2016-090109 A | 5/2016 |
| JP | 2016-191495 A | 11/2016 |
| JP | 2018-179445 A | 11/2018 |
| WO | 2013/038599 A1 | 3/2013 |
| WO | 2016/067817 A1 | 5/2016 |
| WO | 2017/013715 A1 | 1/2017 |
| WO | 2017/110904 A1 | 6/2017 |

OTHER PUBLICATIONS

International Search Report of the International Searching Authority dated Oct. 24, 2017 for the corresponding international application No. PCT/JP2017/026551 (and English translation).
Office Action dated Nov. 16, 2018 in corresponding JP patent application No. 2018-546565 (and English translation).
Chinese Office Action dated Dec. 1, 2020 of corresponding CN Patent Application No. 201780093113.2 (English Machine Translation provided).
Extended European Search Report dated Jul. 6, 2020 issued in corresponding European patent application No. 17918577.2.

\* cited by examiner

AIR-CONDITIONING APPARATUS

CROSS REFERENCE TO RELATED APPLICATION

This application is a U.S. national stage application of PCT/JP2017/026551 filed on Jul. 21, 2017, the contents of which are incorporated herein by reference.

TECHNICAL FIELD

The present invention relates to an air-conditioning apparatus, and particularly relates to an air-conditioning apparatus including a gas sensor that detects refrigerant leakage.

BACKGROUND ART

In existing air-conditioning apparatuses, refrigerant known as flammable refrigerant is used. If the refrigerant leaks, and the concentration of the refrigerant exceeds a certain level of concentration (lower flammability limit), it may ignite. In view of this point, in a given technique, a refrigerant gas sensor that detects leakage of flammable refrigerant such as R32 is provided in an indoor unit of an air-conditioning apparatus, and an indoor unit fan is forcibly rotated upon detection of refrigerant leakage, thereby diffusing the refrigerant to prevent the concentration of the refrigerant from reaching the lower flammability limit (see, e.g., Patent Literature 1).

Furthermore, in another technique, a gas sensor that detects refrigerant leakage is provided on a control board that is housed in a frame body, and a sensor cover is also provided to include an air inlet and slits (air holes) serving as outlets, thereby enabling gas to be detected (see, e.g., Patent Literature 2).

CITATION LIST

Patent Literature

Patent Literature 1: Japanese Patent No. 4599699
Patent Literature 2: Japanese Unexamined Utility Model Registration Application Publication No. 63-27859

SUMMARY OF INVENTION

Technical Problem

However, in the air-conditioning apparatus disclosed in Patent Literature 1, a casing has a hole that extends through the casing between the inside and the outside of the casing, and the sensor is housed in the hole to detect flammable refrigerant gas. In the gas sensor disclosed in Patent Literature 2, a number of air holes and the air inlet are provided in the frame body, and forced airflow is created in the frame body. Therefore, if a user sprays a large amount of gas such as an insecticide gas, near the air-conditioning apparatus, the sensor reacts to the gas and makes erroneous detection.

The present invention has been made to solve the above problem, and an object of the invention is to provide an air-conditioning apparatus in which even if gas other than refrigerant enters an indoor unit of the air-conditioning apparatus through an air inlet provided in the indoor unit, it is possible to reduce the probability that a sensor will make an erroneous detection, and in addition the sensor can reliably detect refrigerant leakage if it occurs.

Solution to Problem

An air-conditioning apparatus according to an embodiment of the present invention uses refrigerant having a density higher than a density of air, and includes: a housing; an air inlet provided in a front surface of the housing to allow the air in a room to flow into the housing; a heat exchanger that transfers heat between the refrigerant and the air that flows into the housing through the air inlet; an air outlet that allows the air subjected to heat exchange at the heat exchanger to be blown from the housing; a fan provided in an air passage extending from the air inlet to the air outlet; and a sensor configured to detect leakage of the refrigerant. The heat exchanger is provided above the fan, and the sensor is provided below the fan.

Advantageous Effects of Invention

In the embodiment of the present invention, because of the above configuration, for example, gas that enters the indoor unit through the air inlet does not easily reach the sensor, and it is therefore possible to reduce the probability that such gas as described above will be erroneously detected as refrigerant leakage. Also, if refrigerant leakage occurs in the air-conditioning apparatus, the sensor can reliably detect the refrigerant that collects at a bottom portion of the inside of the housing.

DESCRIPTION OF EMBODIMENTS

Embodiment 1

Figure 1:
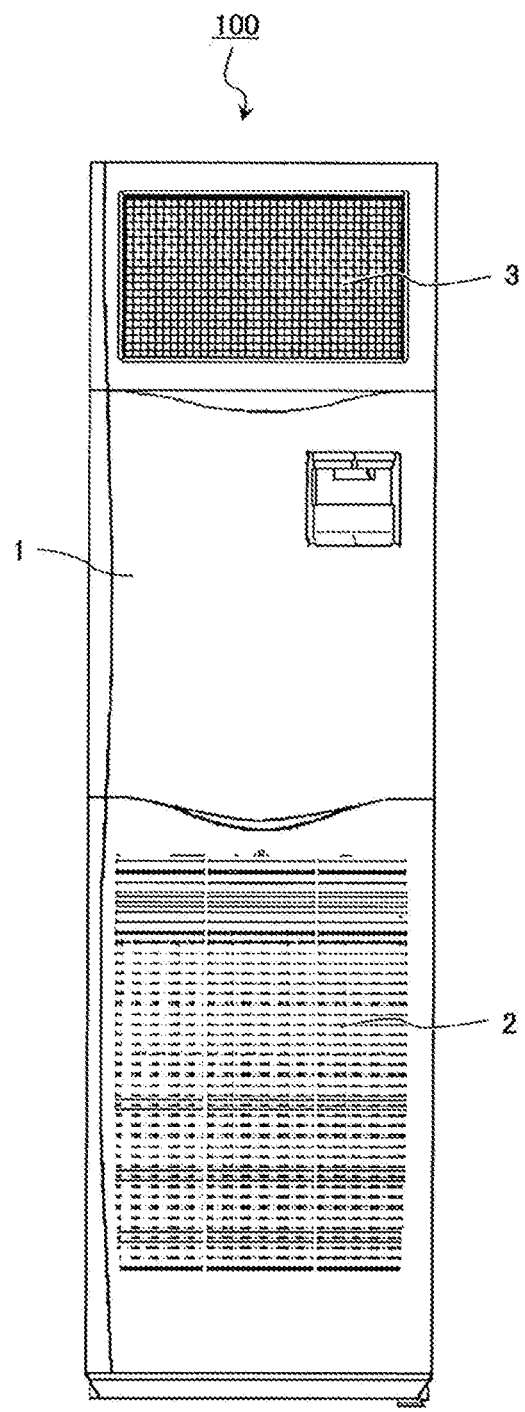
FIG. 1 is a front view of an air-conditioning apparatus 100 according to Embodiment 1 of the present invention.

FIG. 1 is a front view of an air-conditioning apparatus 100 according to Embodiment 1 of the present invention. In the following description, regarding each of the figures, components that are the same as or equivalent to those in a previous figure are denoted by the same reference numerals. As illustrated in FIG. 1, the air-conditioning apparatus 100 of Embodiment 1 has an air inlet 2 and an air outlet 3 both provided in a front surface of a housing 1. The air inlet 2 is formed in a lower portion of the housing 1, and the air outlet 3 is formed in an upper portion of the housing 1. The housing 1 is formed in the shape of a vertical cuboid.

Figure 2:
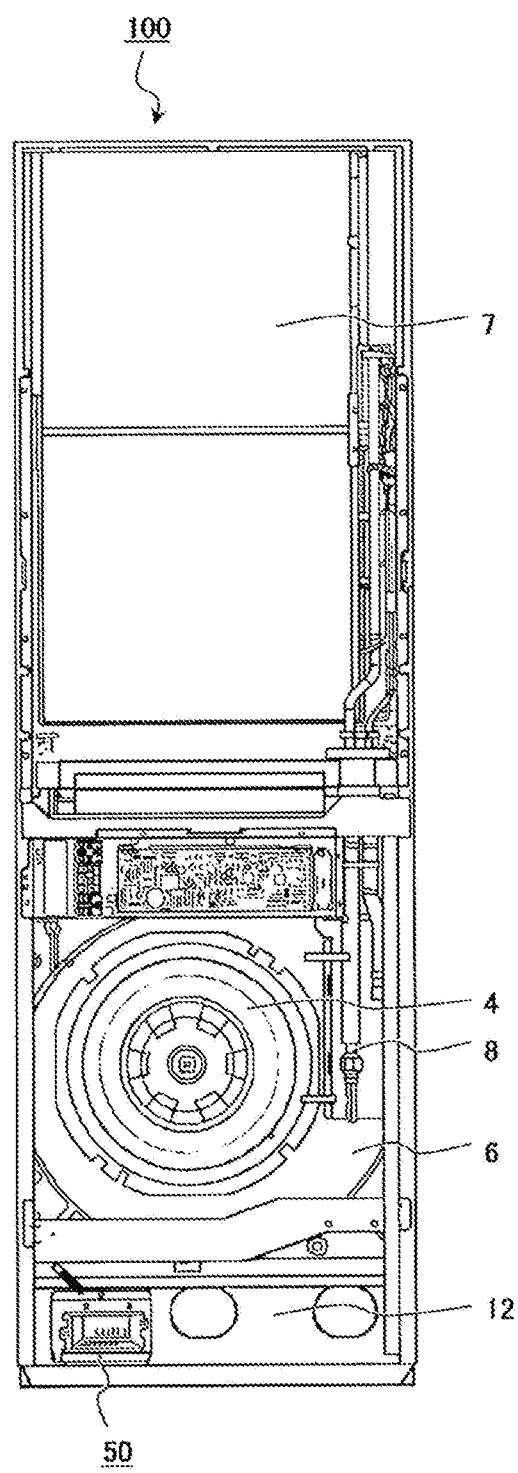
FIG. 2 is a schematic diagram illustrating a cross section of the air-conditioning apparatus as illustrated in FIG. 1 that is parallel to a front surface of a housing of the air-conditioning apparatus.
Figure 3:
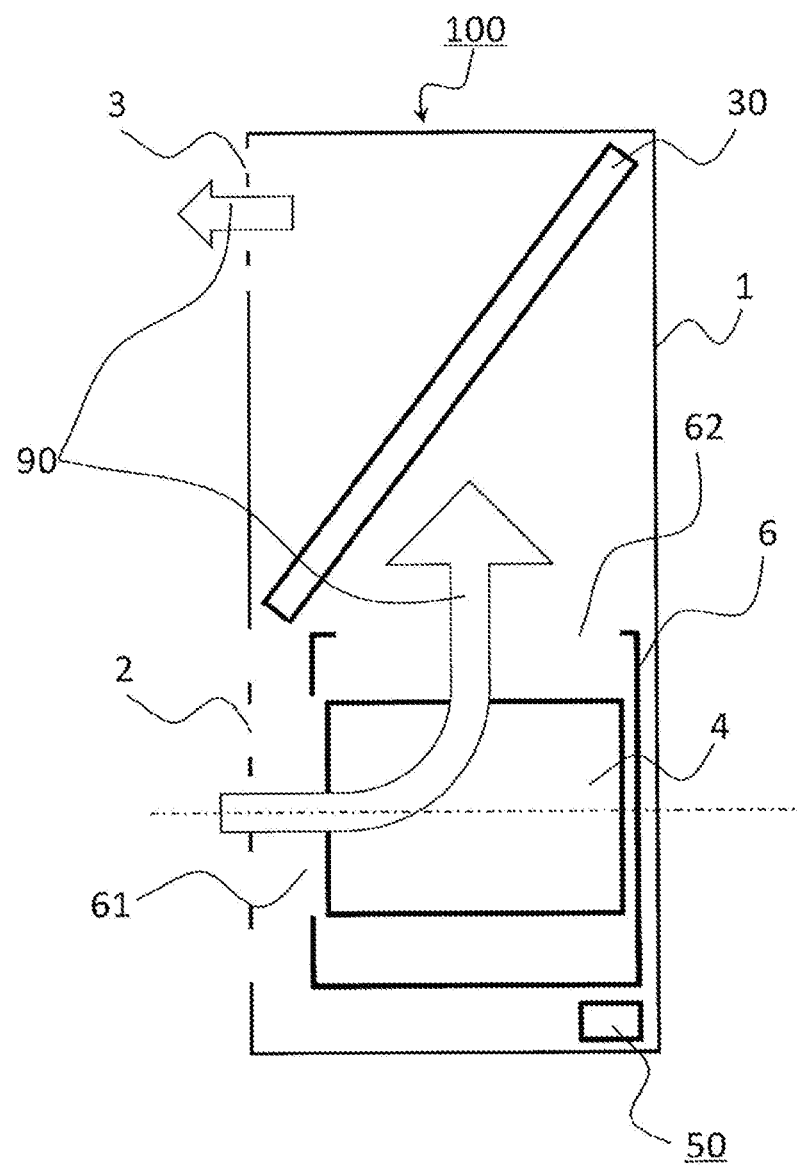
FIG. 3 is a schematic diagram illustrating a cross section of the air-conditioning apparatus as illustrated in FIG. 1 that is parallel to a side surface of the air-conditioning apparatus.

FIG. 2 is a schematic diagram illustrating a cross section of the air-conditioning apparatus 100 as illustrated in FIG. 1 that is parallel to the front surface of the housing 1 of the air-conditioning apparatus 100. FIG. 3 is a schematic diagram illustrating a cross section of the air-conditioning apparatus 100 as illustrated in FIG. 1 that is parallel to a side surface of the air-conditioning apparatus 100. 1. In the 5 housing 1, a fan 4 is provided inward of the air inlet 2. Also, the fan 4 is provided in a fan case 6. The fan case 6 has an inlet portion 61 that allows air 90 from the air inlet 2 to flow into the fan case 6. The fan case 6 also has an outlet portion 62 that allows air 90 in the fan case 6 to flow toward a heat exchanger 30.

The heat exchanger 30 is provided above the outlet portion 62 of the fan case 6. The heat exchanger 30 is located at an air passage that extends from the outlet portion 62 of the fan case 6 to the air outlet 3 of the housing 1. The heat exchanger 30 transfers heat between air 90 sent in by the fan 4 and the refrigerant. In Embodiment 1, 15 as illustrated in FIG. 3, the heat exchanger 30 is obliquely oriented in an upper region in the inside of the housing 1 such that a front end portion of the heat exchanger 30 is located at a lower position and a rear end portion of the heat exchanger 30 is located at an upper position. However, the configuration and the location of the heat exchanger 30 are not limited to those as illustrated in FIG. 3. The heat exchanger 30 is configured to allow air 90 that exchanges heat with the refrigerant in the heat exchanger 30 to be blown out through the air outlet 3.

In a lower portion of the housing 1, a sensor 50 is provided to detect refrigerant leakage. The sensor 50 is located below the fan 4 and the fan case 6. In the inside of the housing 1, a main air passage is provided to extend from the air inlet 2 to the air outlet 3 through the fan 4 and the heat exchanger 30. The sensor 50 is located outside the main air passage.

As illustrated in FIG. 3, the sensor 50 is located behind the inlet portion 61 of the fan case 6, as viewed from the air inlet 2. Preferably, the sensor 50 should be provided on a back side of a bottom portion of the housing 1. Because of this configuration, even if some gas is sprayed near the housing 1 and enters the housing 1 through the air inlet 2, it is possible to reduce the probability that the sensor 50 will detect gas. That is, since the sensor 50 is located away from the air inlet 2 that allows entry of substances that may be erroneously detected as refrigerant leakage, and is also located outside the air passage in the housing 1, it is possible to reduce the probability that such substances will be erroneously detected as refrigerant leakage. Also, the sensor 50 is provided at the bottom portion of the housing 1. Therefore, even if refrigerant leaks from any of the heat exchanger 30, refrigerant pipes, and a flared pipe portion 8 that are provided above the sensor 50, the sensor 50 can reliably detect the refrigerant that leaks and then collects at the bottom portion of the housing 1. It should be noted that the refrigerant for use in the air-conditioning apparatus 100 according to Embodiment 1 is refrigerant that has a higher density than that of air under atmospheric pressure.

Figure 4:
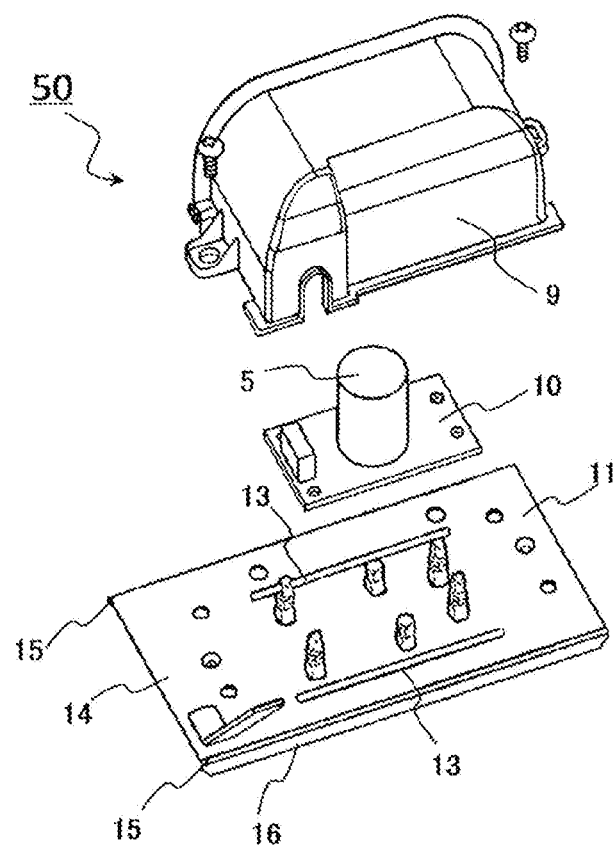
FIG. 4 is a perspective view illustrating a configuration of a sensor of the air-conditioning apparatus according to Embodiment 1 of the present invention.
Figure 5:
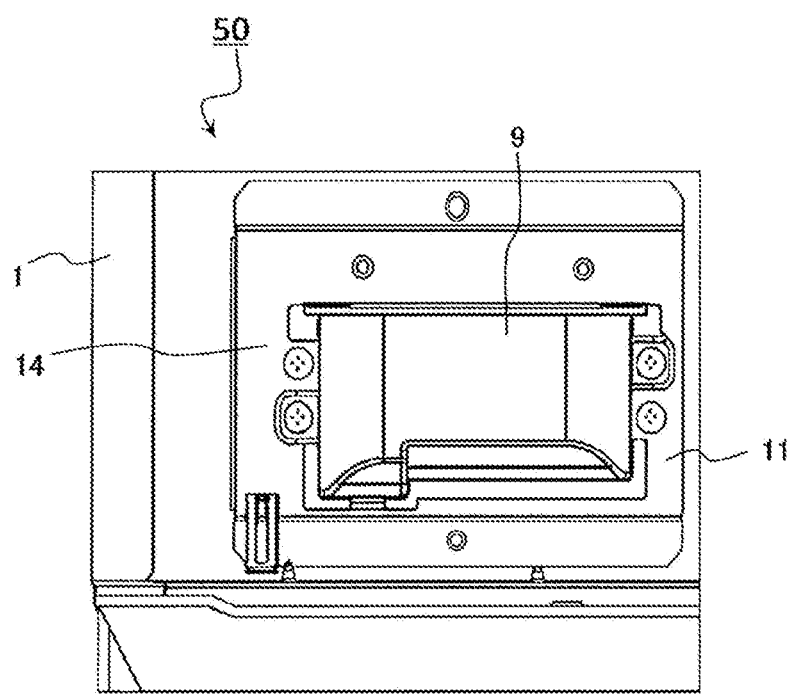
FIG. 5 is an enlarged view of an attachment portion for the sensor as illustrated in FIG. 2.

FIG. 4 is a perspective view illustrating a configuration of the sensor 50 of the air-conditioning apparatus 100 according to Embodiment 1 of the present invention. FIG. 5 is an enlarged view of an attachment portion for the sensor 50 as illustrated in FIG. 2. A sensor unit 5 that detects the refrigerant is mounted on a substrate 10. The substrate 10 includes a circuit configured to operate the sensor unit 5, and a circuit configured to transmit a detection signal to a controller for the air-conditioning apparatus 100 upon detection of the refrigerant. The sensor unit 5 is, for example, a semiconductor gas sensor. When a reducing gas comes into contact with a detecting portion of the semiconductor gas sensor, oxygen atoms in the detecting portion are desorbed and the electrical resistance of the detecting portion drops. Because of this drop of the electrical resistance, the semiconductor gas sensor detects the gas. Therefore, the semiconductor gas sensor can detect the refrigerant when the refrigerant contacts the detecting portion. However, also when a reducing gas other than the refrigerant for use in the air-conditioning apparatus 100 contacts the detecting portion, the semiconductor gas sensor detects the reducing gas. The sensor 50 thus needs to be configured not to detect any gas except the refrigerant that is used in and may leak in the air-conditioning apparatus 100.

The substrate 10 is fixed to a fixing metal plate 11. The fixing metal plate 11 is configured to allow the substrate 10 to be fixed thereto, for example, by screws. The fixing metal plate 11 includes a flat plate portion 14 and a raised portion 15 provided upright from the flat plate portion 14. The flat plate portion 14 has opening portions 13. After the substrate 10 is mounted on the flat plate portion 14, the opening portions 13 are located in the vicinity of the substrate 10. A sensor cover 9 is attached to the fixing metal plate 11. The sensor cover 9 is formed to cover the sensor unit 5. Therefore, when the sensor cover 9 is attached to the fixing metal plate 11, the sensor unit 5 is enclosed by the sensor cover 9 and the fixing metal plate 11. Because of such a configuration, only gas that has passed through the opening portions 13 provided in the fixing metal plate 11 will come into contact with the sensor unit 5. Therefore, for example, even if a large amount of gas is sprayed near the air-conditioning apparatus 100, the gas does not easily enter the sensor 50. It is therefore possible to reduce the probability that the sensor 50 will erroneously detect the gas as leaking refrigerant.

Preferably, the opening portions 13 provided in the sensor 50 should be configured not to face the air inlet 2 of the housing 1. To be more specific, since the air inlet 2 is provided on the front side of the housing 1, it is appropriate that the opening portions 13 are provided not to face the front side. The opening portions 13 may be provided to face the bottom side of the housing 1. In this case, even if gas other than the refrigerant enters the housing 1 through the air inlet 2, the gas does not easily flow into the sensor 50, and in addition, in the case where refrigerant leaks and collects at the bottom of the housing 1, the refrigerant easily flows into the sensor 50 through the opening portions 13 facing the bottom side of the housing 1, whereby the sensor 50 can easily detects refrigerant leakage.

To be more specific, the sensor 50 is fixed to an attachment portion for the sensor 50 that is provided in the housing 1, with a distal end portion of the raised portion 15 of the fixing metal plate 11 brought into contact with the attachment portion. Between the attachment portion and the flat plate portion 14 of the fixing metal plate 11, space is necessarily provided. For example, in the case where the sensor 50 is fixed, with the fixing metal plate 11 facing the bottom side of the housing 1, space is provided between the bottom of the housing 1 and the flat plate portion 14 of the fixing metal plate 11. Therefore, although for example, gas that enters the housing 1 from the outside thereof does not easily enter the sensor 50, the refrigerant that collects at the bottom of the housing 1 enters the sensor 50 through the opening portions 13. Thus, because of the above configuration, the sensor 50 hardly erroneously detects gas as leaking refrigerant, but can easily detect refrigerant leakage if it occurs.

The opening portions 13 may be provided to face a back side of the housing 1. In this case, the opening portions 13 can be located farthest from the air inlet 2, and the probability of erroneous detection by the sensor 50 can thus be easily reduced.

Although as illustrated in FIG. 4, the opening portions 13 are provided in the fixing metal plate 11 of the sensor 50, they may be provided in the sensor cover 9. In this case, the opening portions 13 in the sensor cover 9 are provided in the same manner as described above with respect to the case where the opening portions 13 are provided in the fixing metal plate 11, thereby enabling the sensor 50 to reliably detect refrigerant leakage while reducing the probability of erroneous detection.

Advantages of Embodiment 1

(1) The air-conditioning apparatus according to Embodiment 1 uses refrigerant having a higher density than that of air, and includes the housing 1, the air inlet 2 provided in the front surface of the housing 1 to allow air in a room to flow into the housing 1, the heat exchanger 30 that transfers heat between refrigerant and the air that flows into the housing 1 through the air inlet, the air outlet 3 that allows the air subjected to heat exchange at the heat exchanger 30 to be blown from the housing 1 to the outside thereof, the fan 4 provided in the air passage extending from the air inlet 2 to the air outlet 3, and the sensor 50 that detects refrigerant leakage. The heat exchanger 30 is located above the fan 4, and the sensor 50 is located below the fan 4.

By virtue of the above configuration, in the case where refrigerant leaks from any of the heat exchanger 30, refrigerant pipes, and the flared pipe portion 8 that are disposed above the sensor 50 of the air-conditioning apparatus 100, and collects at the bottom of the housing 1, the sensor 50 can reliably detect the leaking refrigerant collecting at the bottom of the housing 1. Also, if gas that is not the refrigerant enters the housing 1 from the vicinity of the air-conditioning apparatus 100, it is possible to reduce the probability that the sensor 50 will erroneously detect the above gas as leaking refrigerant.

(2) In the air-conditioning apparatus 100 according to Embodiment 1, the sensor 50 is provided outside the main air passage that extends from the air inlet 2 to the air outlet 3 through the fan 4 and the heat exchanger 30.

Because of this configuration, it is possible to reduce the probability that the sensor 50 will erroneously detect gas contained in air that is introduced into the housing 1 during a normal operation of the air-conditioning apparatus 100, as leaking refrigerant.

(3) In the air-conditioning apparatus 100 according to Embodiment 1, the fan 4 is housed in the fan case 6, and the fan case 6 includes the inlet portion 61 that allows air to flow into the fan case 6. The sensor 50 is provided in the housing 1 and located closer to the back side of the housing 1 than an imaginary plane in which the inlet portion 61 is located.

In the above configuration, the sensor 50 is located outside the main air passage that extends from the air inlet 2 through the inlet portion 61. It is therefore possible to reduce the probability that the sensor 50 will erroneously detect gas contained in air introduced into the housing 1 during the normal operation of the air-conditioning apparatus 100, as leaking refrigerant. Also, when the air-conditioning apparatus 100 is in the stopped state, even if gas or the like is sprayed near the air-conditioning apparatus 100 and enters the housing 1, it is possible to reduce the probability that the gas will be erroneously detected as leaking refrigerant. This is because the sensor 50 is provided close to the back side of the housing 1.

(4) In the air-conditioning apparatus 100 according to Embodiment 1, the sensor 50 includes the sensor unit 5 provided on the substrate 10, the fixing metal plate 11 to on which the substrate 10 is mounted, the sensor cover 9 that covers the sensor unit 5, and the opening portions 13 that allows air to flow into the sensor 50. In the passage extending from the air inlet 2 to the sensor 50, the opening portions 13 face a region where the air inlet 2 is not provided.

Since the passage extending from the air inlet 2 to the sensor 50 in the air-conditioning apparatus 100 is not the main air passage, gas that can be erroneously detected as leaking refrigerant does not easily enter the above passage. However, when the air-conditioning apparatus 100 is in the stopped state, there is a possibility that gas that can be erroneously detected as leaking refrigerant will enter the passage extending from the air inlet 2 to the sensor 50. Even in such a case, because of the above configuration, gas cannot easily reach the sensor unit 5, whereby it is possible to reduce the probability that the gas will be erroneously detected as leaking refrigerant.

(5) In the air-conditioning apparatus 100 according to Embodiment 1, the opening portions 13 are open to face toward the bottom side of the housing 1.

Therefore, in the air-conditioning apparatus 100, if refrigerant leaks, it collects at the bottom of the housing 1. Therefore, in the above configuration, refrigerant easily enters the sensor 50 through the opening portions 13 and reaches the sensor unit 5. It is therefore possible to obtain an advantage in which when refrigerant leakage occurs, it can be reliably detected before the concentration of the refrigerant reaches the lower flammability limit of the refrigerant, in addition to the above advantage described in above item (4).

(6) In the air-conditioning apparatus 100 according to Embodiment 1, the opening portions 13 are provided in the fixing metal plate 11.

(7) In the air-conditioning apparatus 100 according to Embodiment 1, the substrate 10 is fixed to a center portion of the fixing metal plate 11, and the opening portions 13 are located in the vicinity of the substrate 10.

In this configuration, only the opening portions 13 provided in the fixing metal plate 11 allow gas to enter the sensor 50. The air-conditioning apparatus 100 can thus obtain the advantages as described in item (5).

(8) In the air-conditioning apparatus 100 according to Embodiment 1, the fixing metal plate 11 includes the raised portion 15 provided upright from the flat plate portion 14. The sensor 50 is fixed to the attachment portion for the sensor 50, which is provided in the housing 1, with the distal end of the raised portion 15 brought into contact with the attachment portion.

In this configuration, the flat plate portion 14 of the fixing metal plate 11 of the sensor 50 is fixed to the attachment portion for the sensor 50, with space provided between the flat plate portion 14 and the attachment portion. Thereby, gas that can be erroneously detected as leaking refrigerant does not easily reach the sensor unit 5. Therefore, the air-conditioning apparatus 100 can not only more reliably obtain the advantage described in (4), but can reliably detect refrigerant leakage if it occurs, before the concentration of the refrigerant reaches the lower flammability limit of the refrigerant.

REFERENCE SIGNS LIST 1 housing, 2 air inlet, 3 air outlet, 4 fan, 5 sensor unit, 6 fan case, 8 flared pipe portion, 9 sensor cover, 10 substrate, 11 fixing metal plate, 13 opening portion, 14 flat plate portion, 15 raised portion, 30 heat exchanger, 50 sensor, 61 inlet portion, 62 outlet portion, 100 air-conditioning apparatus

The invention claimed is:

1. An air-conditioning apparatus using refrigerant having a density higher than a density of air, the air-conditioning apparatus comprising:
   a housing;
   an air inlet provided in a front surface of the housing and configured to allow the air in a room to flow into the housing;
   a heat exchanger configured to transfer heat between the refrigerant and the air that flows into the housing through the air inlet;
   an air outlet configured to allow the air subjected to heat exchange at the heat exchanger to be blown from the housing to the outside thereof;
   a fan provided in an air passage extending from the air inlet to the air outlet; and
   a sensor configured to detect leakage of the refrigerant, wherein
   the heat exchanger is provided above the fan,
   the fan is housed in a fan case provided with an inlet portion configured to allow the air to flow into the fan case,
   the sensor is provided below the fan and outside the air passage that extends from the air inlet to the air outlet through the fan and the heat exchanger, the sensor being located closer to a back side of the housing than an imaginary plane in which the inlet portion is located,
   wherein the sensor includes a sensor unit provided on a substrate, a fixing metal plate to which the substrate is mounted, a sensor cover configured to cover the sensor unit, and an opening portion configured to allow the air to flow into the sensor, and in a passage that extends from the air inlet to the sensor, the opening portion faces a region in which the air inlet is not located, and
   the opening portion is provided in the fixing metal plate.

2. The air-conditioning apparatus of claim 1, wherein the opening portion is open to face a bottom of the housing.

3. The air-conditioning apparatus of claim 1, wherein
   the substrate is fixed to a center portion of the fixing metal plate, and
   the opening portion is located in the vicinity of the substrate.

4. The air-conditioning apparatus of claim 1, wherein
   the fixing metal plate includes a flat plate portion and a raised portion provided upright from the flat plate portion, and
   the sensor is fixed to an attachment portion for the sensor that is provided in the housing, with a distal end of the raised portion brought into contact with the attachment portion.

* * * * *